Figure 1:
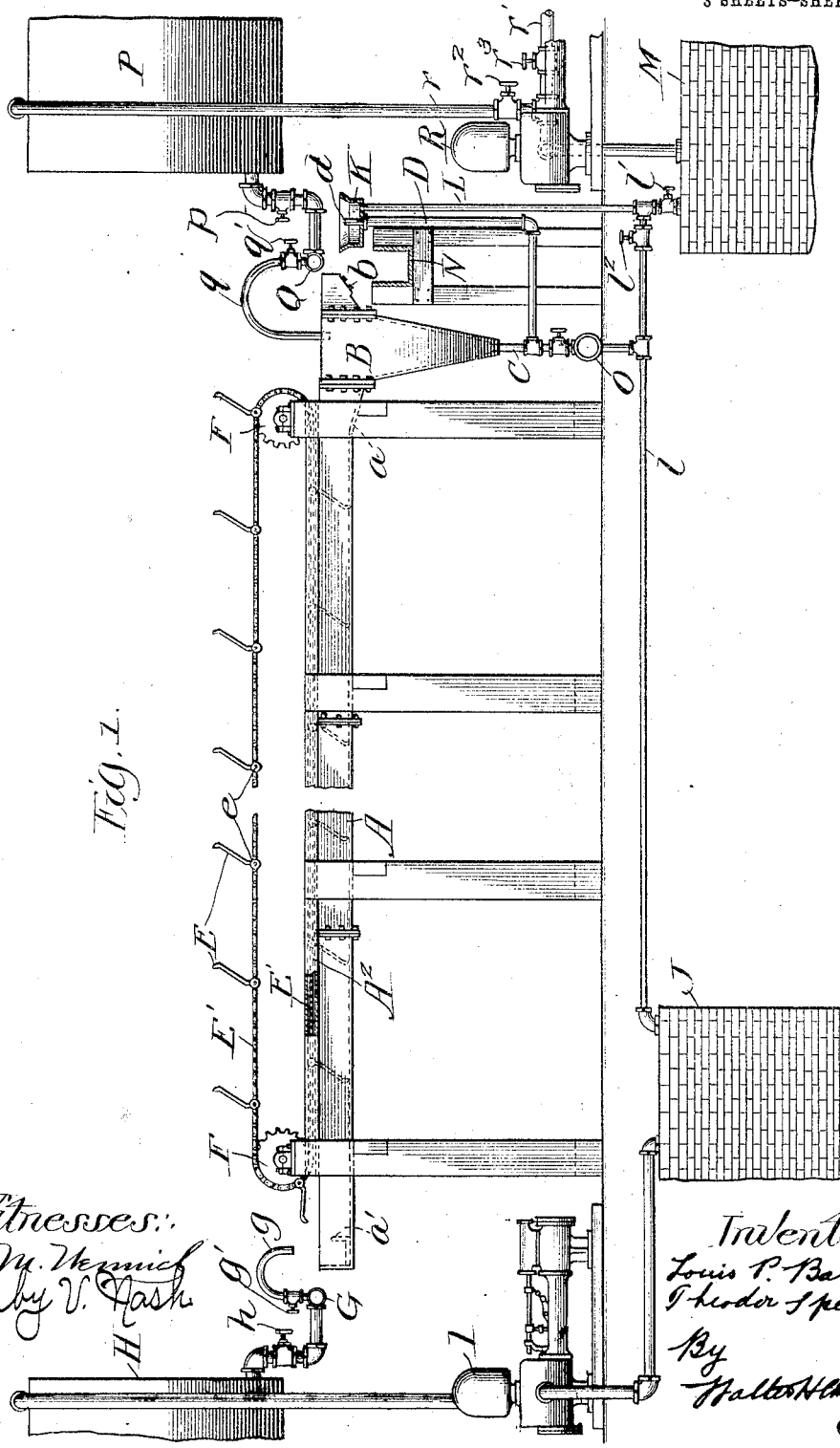

L. P. BAUER & T. SPECK.
MANUFACTURE OF STARCH.
APPLICATION FILED JAN. 17, 1908.

986,541.

Patented Mar. 14, 1911.

3 SHEETS—SHEET 1.

L. P. BAUER & T. SPECK.
MANUFACTURE OF STARCH.
APPLICATION FILED JAN. 17, 1908.

986,541.

Patented Mar. 14, 1911.

3 SHEETS—SHEET 2.

L. P. BAUER & T. SPECK.
MANUFACTURE OF STARCH.
APPLICATION FILED JAN. 17, 1908.

986,541.

Patented Mar. 14, 1911.

3 SHEETS—SHEET 3.

Witnesses

Inventors
Louis P. Bauer and
Theodor Speck
by Walter H. Chamberlin
Atty

UNITED STATES PATENT OFFICE.

LOUIS P. BAUER AND THEODOR SPECK, OF CHICAGO, ILLINOIS; SAID SPECK ASSIGNOR TO SAID BAUER.

MANUFACTURE OF STARCH.

986,541.

Specification of Letters Patent.   Patented Mar. 14, 1911.

Application filed January 17, 1908. Serial No. 411,257.

*To all whom it may concern:*

Be it known that we, LOUIS P. BAUER and THEODOR SPECK, both citizens of the United States, residing at Chicago, county of Cook, State of Illinois, have invented a certain new and useful Improvement in the Manufacture of Starch, and declare the following to be a full, clear, and exact description of the same, such as will enable others skilled in the art to which it pertains to make and use the same, reference being had to the accompanying drawings, which form a part of this specification.

Our invention relates to the art of separating from each other and recovering in pure form substances which are held in suspension in a common liquid medium, where such substances differ materially from each other in specific gravity or in their capability of settling in the liquid medium under certain conditions as, for example, when the medium is caused to spread out slowly or travel slowly in a thin layer or film.

In the art of starch-making, the finely ground starch is at one stage intimately mixed with gluten and other lighter materials and, in order to obtain pure starch, it is necessary to remove the gluten and other materials. Our invention is particularly adapted for carrying out this latter step in the art of starch-making; and, for the sake of brevity, we shall confine our discussion to explanation of the construction, mode of operation and utility of our invention as applied to this particular art; it being understood, however, that the invention may be practiced in re-tabling or settling starch and the like, or recovering in pure form any substance of the general character previously mentioned.

Our invention has for its object to provide means for carrying out separating or settling operations of the character referred to in a novel and improved manner.

A further object of our invention is to provide a simple and efficient apparatus whereby the processes of separation and recovery are made continuous and with only a very short lapse of time between the settling of any particular particle of starch or the like and its recovery and delivery at any desired point.

A further object of our invention is to provide means whereby the starch or the like may be delivered in comparatively pure form and in a liquid state as it is settled, thereby permitting it to be transported through pipes or conduits to points where further operations are to be performed thereon.

In one of its aspects our invention may be regarded as comprising means for producing a slowly and gently moving stream from which the substance to be recovered, or one of them, may be caused to settle; causing the settled substance to move with the stream so as to prevent hardening or packing thereof; and finally causing the stream to be divided into two sub-streams which branch respectively from the bottom thereof and from a point above the bottom.

In another aspect our invention may be regarded as comprising means for maintaining in suspension in a liquid medium a deep mass of the substance to be recovered; supplying the liquid from which the substance is to be recovered in a thin gently-moving layer so as to permit the substance which is to be recovered to be settled; collecting the settled substance upon the deep mass thereof which is held in suspension; and discharging from a point at the bottom of said mass and from a point above the mass.

Figure 2:
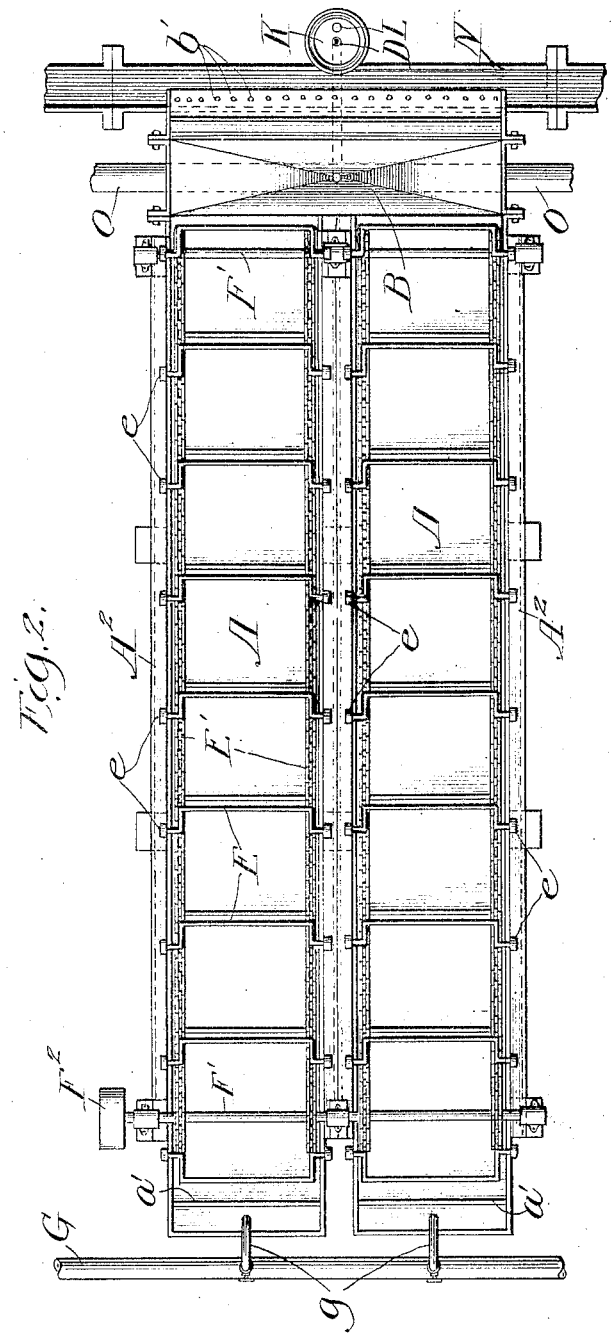
Figure 3:
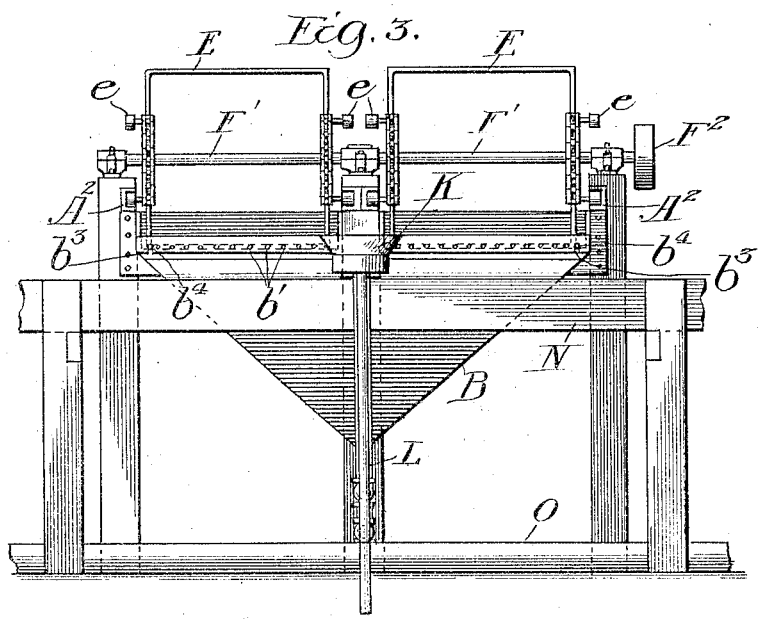
Figure 4:
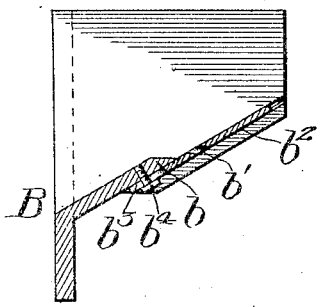

The various features of novelty which characterize our invention will be hereinafter pointed out with particularity in the claims; but for a full understanding of the invention in its various aspects, and of its various objects and advantages, reference may be had to the following detailed description taken in connection with the accompanying drawings, wherein:

Figure 1 is a side elevation showing a single unit arranged in accordance with our invention for separating starch from a watery mixture of starch with gluten and other impurities; Fig. 2 is a plan view of a portion of the unit shown in Fig. 1; Fig. 3 is an end elevation of a portion of said unit; and Fig. 4 is a detail.

Referring to the drawings, A indicates a broad shallow trough or table somewhat similar to the tables which are ordinarily employed but preferably much shorter. At one end of the table is arranged a depending hopper. We have found in practice that it is desirable to have a comparatively large hopper and it is therefore convenient to use at least two tables in each unit, although we do not desire to be understood as limiting ourselves to the use of more than one table for each hopper. The hopper, which in the present instance is shown as extending across one end of each of the two tables, is indicated at B. The tables are preferably, though not necessarily inclined slightly so as to be a little lower at the hopper end than at the other. The tables are preferably given a considerable slope immediately adjacent to the hopper, as at $a$. At the ends of the tables opposite that at which the hopper is located are transverse partitions $a'$ of a depth somewhat less than the depth of the side walls of the tables; thereby forming transverse troughs across the ends of the tables. The sides of the hopper converge until they almost meet at a point considerably below the tables and an outlet C is provided at this point. From this outlet leads a pipe D which extends laterally and then upwardly to a level approximately in the plane of the tables. The upper end of the hopper, beginning at a point in the vicinity of the plane of the tables, is widened in the direction of the length of the tables by making the front wall thereof more nearly horizontal at the top, as at $b$, than throughout the remainder of the hopper. The top of the wall $b$ rises to a level somewhat above the plane of the tables.

E E represent a series of paddles or scrapers, preferably U-shaped as shown, which are carried upon endless chains or the like. There is a set of these scrapers or paddles for each table and they and their supporting chains are so arranged with respect to the tables that the scrapers or paddles may be caused to move slowly across the tops of the tables from the rear end to the end at which the hopper is situated. During this passage across the tables the scrapers or paddles preferably ride directly upon the surfaces of the tables. The endless carriers for the scrapers or paddles may be supported in any suitable manner, as for example, by sprocket wheels F secured upon shafts F' mounted at opposite ends of the tables and extending transversely thereof. Motion may be imparted in any suitable manner as, for example, by means of a belt pulley $F^2$ upon one of the shafts. If desired, rollers $e$ running upon stationary tracks $A^2$ may be arranged upon the traveling carriers adjacent the points of connection between the scrapers and paddles and the traveling carriers. By providing these tracks, the proper relation is at all times maintained between the tables or paddles or scrapers even though the carriers should stretch and tend to sag.

G is a header arranged adjacent the rear end of the tables and provided with a discharge pipe $g$ at each table, the outlets of these pipes being directly above the transverse troughs formed by the partitions $a'$. There is a valve $g'$ in each of the pipes $g$, so that the header may be caused to discharge into any desired number of units or portions of units and be prevented from discharging into the others. While we have shown only a single unit composed of two tables it will of course be understood enough individual tables or groups of tables arranged in the form of units will be employed to take care of the output of any particular factory. The header G may be made to extend adjacent as many of the tables as is convenient, it being of course understood that where it is not convenient to use a single header a plurality of headers will be employed. The header G is preferably supplied from a tank such as H which in turn receives its supply from a pump I or other source. The pump could be connected directly to the header but, by interposing the tank or reservoir, a steady pressure may be maintained within the header regardless of variation in pressure in the pipe leading from the pump. The suction end of the pump is connected to a tank or reservoir J. The tank J, in the form of our invention illustrated, may and preferably does receive the watery mixture of starch with gluten and other impurities directly after the bolting operation; for, as will hereinafter appear, the usual settling tank, wherein a part of the water is separated from the mixture, may be entirely eliminated.

To carry out our invention in a simple form, the valve $g'$ in one of the pipes $g$ is opened and the watery mixture of starch with gluten and other impurities is permitted to flow upon the corresponding table. As soon as the transverse trough is full, a broad thin sheet of the mixture overflows upon the table and starts on a course toward the opposite end. This steady overflow will be maintained as long as the supply lasts and therefore there will be a slow and gentle flow across the table to the hopper. As in the old process, to which we have previously referred, the starch settles more readily than the gluten and other impurities and before any given portion of the flowing stream has traveled very far, the greater part of the starch will have settled upon the surface of the table and directly above the table will be a stratum of gluten and other impurities which have begun to settle and also some starch which is still mingled with the impurities. Assuming that the hopper has been empty, the material will flow into the hopper and fill it before it will overflow at the front end of the hopper. The contents of the hopper would now be in substantially the same state as that of the mixture as it enters upon the table except that most of the starch would have been removed therefrom, if the precipitated starch were allowed to lie upon the table. However, the endless carriers are set in operation and the scrapers or paddles slowly move across the face of the table and carry before them the starch which has settled and finally push this starch into the hopper. As soon as the hopper has become filled, the level of the fluid upon the table rises until there is an overflow at the front end of the hopper. Thereafter practically no gluten or other impurities enter the hopper, as these substances will be carried with the current and overflow at the end of the hopper. The end of the pipe D preferably opens into the bottom of a receptacle K from the bottom of which leads a pipe L. This pipe is connected to a tank M for containing pure starch. There is also a branch $l$ which leads to the tank J. The outlet end of the pipe D is at such an elevation that when the overflow at the front end of the hopper begins, the contents of the hopper also begin to flow through the pipe D and out of its upper end into the receptacle K. In starting under the conditions assumed, a valve $l'$ in the pipe L is closed and a valve $l^2$ in the pipe $l$ is opened. Therefore all of the material discharged into the receptacle K flows back to the tank J and not into the tank for containing pure starch. The apparatus need be in operation only a short time, however, before the original impure charge of the hopper has been entirely withdrawn and its place taken by a mass of pure watery starch which is gradually built up by the increments which are pushed into the top of the hopper by the paddles or scrapers. Therefore, the operator need only watch the color of the material discharged from the pipe D and, when the color becomes pure white and the density is high enough, the valve $l^2$ may be closed and the valve $l'$ opened. All of the material which thereafter flows out of the bottom of the hopper is then led directly to the reservoir for containing pure starch.

The starch as it settles upon the table does not immediately form into a hard mass but remains in a semi-liquid state so that by properly adjusting the rate of movement of the carriers no difficulty will be experienced in keeping the top of the table clean and preventing the formation of a hard layer of starch which must be removed manually. Furthermore, the starch is finally delivered in such a manner that it may be conveyed through pipes to any desired point; thereby not only avoiding the necessity of shoveling tough heavy masses of starch from the table, but also making the transportation of the starch simple and convenient.

We have found that by properly proportioning and adjusting the parts, a mixture, having a density of 5 degrees Baumé as it enters upon one end of a table approximately 20 feet long, may be so modified that the density of the liquid which overflows the front end of the hopper will be in the neighborhood of 2 degrees Baumé while the density of the liquid starch which is delivered from the bottom of the hopper may have a density of 18 degrees Baumé or more. If desired, the mixture which overflows at the front end of the hopper may be carried over another table where some of the starch which has been kept in suspension together with the gluten and other impurities will be settled and the density of the mixture as it finally overflows at the end of the second table be reduced still more. The gluten and other impurities tend also to settle but not nearly so rapidly as the starch. In the usual process it is necessary for attendants to closely watch the tables and scrape from the surface of the settled starch any accumulation of gluten and other impurities which may take place. By making the tables which form part of the present apparatus fairly short, the impurities including the gluten may be carried entirely across the table before they have an opportunity to settle with the starch; and the only impurities which remain in the starch which is discharged from the hopper comprise those small traces which it is practically impossible to remove by any process.

The pipe D is preferably made adjustable so that the head which serves to force the starch through this pipe may be nicely adjusted so as to secure the best results. A convenient arrangement consists in having at the upper end of the pipe D a small section of pipe $d$ which may be screwed into and out of the main pipe sufficiently to vary the level of the discharge outlet, within any desired limits. Similarly, it is desirable to provide means for varying the level which the liquid upon a table must reach before it overflows at the front end of the hopper; better results being obtained in some cases with one depth of liquid upon the table while in other instances a different depth is advisable, depending upon the nature of the material which is being treated.

As hereinbefore stated, the gluten and other impurities, together with some of the starch, settle partially in the flowing stream so that there is a perceptible layer of impurities mixed with starch very close to the surface of the table. In order to prevent this impure mixture from being drawn into the hopper as it passes across the top thereof we prefer to provide an auxiliary outlet at the front end of the hopper in approximately the plane of the layer of impurities. This outlet may conveniently consist of a plurality of perforations $b'$ in the wall $b$ of the hopper, the perforations lying very near the plane of the top of the table. When the depth of the material upon the table is varied the depth to which the impurities sink varies also; and, if desired, the same means may be used for adjusting the height with respect to the table of both of the overflows at the front end of the hopper. This adjustment may conveniently be effected by making a portion of the wall $b$, as at $b^2$, detachable and supporting in such a manner that it may be moved up and down within any desired limits. A simple form of support consists in providing one or more elongated slots $b^3$ in the member $b$, together with screws or bolts $b^4$ which pass through these slots into the stationary portion of the hopper. When it is desired to raise the level of the liquid upon the table the screws $b^4$ are loosened, the member $b^2$ is raised or lowered as the case may be, and the screws are again tightened so as to retain the member $b^2$ in its adjusted position. This particular adjustment may be effected in any other desired way however.

The water and impurities which overflow at the front end of the hopper may be received in a trough N which extends adjacent any desired number of tables or units and conducts the overflow to any desired point.

It will be seen that the scrapers or paddles remove the starch as fast as it settles and deposit it into the top of the hopper. The surface over which the mixture flows is therefore always kept smooth and even and there is little possibility of obstructing the flow of the partially settled layer of gluten and other impurities. When the hopper is reached the starch gradually moves downward over the inclined portion $a$ of the table so that there is no sudden change of current, and the watery mixture containing the impurities flows freely across the top of the hopper and is discharged at a point considerably in front of the main portion of the hopper. The cross-sectional area of the hoppers near the top thereof is made sufficiently great to prevent any disturbance or agitation due to the discharge through the comparatively small outlet C, there being only a gradual settling of the watery starch in the hopper and, because of the continued addition of settled starch there is actually very little apparent change in the upper portion of the hopper.

Since the starch has a tendency to settle and to cake upon the surfaces over which it passes, the discharge stream of pure starch should be made as large as possible in order to prevent any such caking through settling. It is obvious that a larger discharge stream can be obtained by combining the discharge streams from a plurality of tables and for this reason it is preferable, though not essential, that a single hopper be employed in connection with at least two of the tables.

After the valve $g'$, the overflow controlling device $b^2$, and the pipe $d$ have once been carefully adjusted so as to make the conditions at the discharge ends of the tables such as to produce the best results for a given stream which is flowing upon the tables, no further attention need be given to the apparatus. Therefore, any desired number of tables or groups of tables may be brought into operation or stopped by simply opening or closing a valve $h$ between the tank H and the header G. As long as the raw starch mixture is supplied at a uniform rate the starch will be separated and delivered in a liquid state and may be transported to such points where it is desired to operate further upon the starch without requiring any handling or attention on the part of an operator.

In case it should be desired to drain all of the material from any table and its hopper, we have provided a header O which is connected to any desired number of hopper outlets, the communication between the outlets and the headers being controlled by valves $o$. This header may be connected to the pipe $l$ which leads to the reservoir J containing the raw material. When it is desired to drain any unit, the proper valve $o$ is opened and the contents of the unit flow into the header and thence to the reservoir J.

It is not necessary, in starting the apparatus, to permit the hopper to become filled with the raw mixture, but a supply of pure starch may be provided so that the hopper may be filled therewith before the stream of raw starch is turned on. Any suitable arrangement may be provided for conveniently filling the hoppers, as for example, there may be an auxiliary reservoir P corresponding to the reservoir H, the reservoir P containing pure watery starch.

Q is a header similar to the header G and $q$ $q$ are pipes leading from the header Q to the hoppers of the tables with which the header is associated.

$p$ is a valve controlling the supply of starch from the reservoir to the header, and $q'$ $q'$ are valves in the pipes $q$ $q$.

The reservoir P may obtain its supply in any suitable manner. Thus, there may be a pipe $r$ leading into the top of this reservoir from the discharge side of the pump R which normally serves to pump the liquid starch from the main reservoir M and force it into a pipe line $r'$. There may be valves $r^2$ and $r^3$, respectively, in the pipe $r$ and in the pipe line $r'$, so that the pump may be made to supply only the tank P or the pipe line.

It is sometimes necessary to stop the separating operation at some of the tables for a short time, in which case it would not be economical to drain the tables or permit the starch in the hoppers to remain quiet so as to permit settling and packing of the starch in the hoppers. When it is desired to thus temporarily shut down some of the tables, the header Q is placed in communication with the reservoir P and the valves q' in the proper pipes q are opened. Therefore pure starch flows through some of the pipes q into the hoppers with which they are associated and is discharged from the bottom of such hoppers through the pipe D and returns to the main reservoir. If the reservoir P is a small one or if the tables are to remain inactive for a considerable period, the pump R may be made to supply the auxiliary reservoir with starch as fast as it is taken out of the reservoir. Thus a natural circulation of pure starch may be maintained throughout the inactive hoppers and the hoppers and the pipes leading therefrom will be maintained clean, so that all of the tables may again be placed in operation at a moment's notice.

The tables and hoppers are preferably made of metal so that they will retain their shapes and their inner surfaces will remain smooth under all conditions. Of course it is not necessary to make these parts of metal but we believe it would be preferable for the reason that wooden tables warp and become uneven, thereby interfering with the efficiency of the operation. The paddles or scrapers are also preferably formed so that their upper edges will lie below the surface of the moving stream, thereby permitting a natural flow of the main portion of the stream and avoiding the formation of eddy currents which might result in mixing impurities with the settled starch.

Where the partially exhausted mixture is passed over a second table or set of tables the same adjustments are made as at the first table or set of tables and thereafter no further attention need be given thereto since the supply of mixture will be steady and uniform. The entire separating and recovering process is therefore accomplished automatically and continuously and there need be no cessation in the operation in order to permit the removal of the starch. Furthermore all of the starch which is recovered is in pure form and there is no need for retabling a portion thereof as in the case of the old process where there is always an accumulation of impure starch at each end of the tables.

While we have described in detail an apparatus which has been found to be very efficient and satisfactory, we do not desire to be limited to the details of construction illustrated and described, since, in its broader aspects, our invention may take various other forms as will be evident from the definitions thereof which constitute the appended claims. Furthermore, while we have described an apparatus especially designed for separating and recovering starch from an impure watery mixture, we do not desire to be limited to the use of our apparatus in this particular field, since it may be employed to advantage wherever it is desired to recover in pure form a substance which is held in suspension in a liquid medium and where there may be present impurities which differ from such substances in specific gravity or in their capability of settling in the liquid medium under conditions similar to those which have been described. Therefore, while we have used the terms starch and gluten we desire to have it understood that these terms mean substances to be recovered or impurities.

Having now fully described our invention, what we claim as new and desire to secure by Letters Patent is:—

1. An apparatus for recovering starch from an impure watery mixture of the same and impurities of less specific gravity, which consists of a table, means for slowly delivering said mixture to said table so as to produce a flow of said mixture over the table sufficiently slow to permit the starch to settle upon the table, there being an outlet for the spent water and impurities at a point near the top of the flowing mixture and a second outlet extending downwardly from the table, and a device for moving the settled starch gently across the table toward said second outlet independently of the flow of said mixture and without agitating it.

2. An apparatus for recovering starch from an impure watery mixture of the same and impurities of less specific gravity, which consists of a table, means for slowly delivering said mixture to the table so as to cause said mixture to flow gently across the table at a rate sufficiently slow to permit the starch to settle upon the table, a hopper depending from the table, there being an outlet from the table at a point above the bottom of the hopper, and there being also a second outlet extending from the bottom of the hopper, and means in addition to the stream itself for moving the settled starch across the table and toward the hopper.

3. An apparatus for recovering starch from an impure watery mixture of the same and impurities of less specific gravity, which consists of a table, means for slowly delivering said mixture to the table so as to cause said mixture to flow gently across the table at a rate sufficiently slow to permit the starch to settle upon the table, a hopper depending from the table, there being an outlet from the table at a point above the bottom of the hopper, and there being also a second outlet extending from the bottom of the hopper, and means for maintaining a circulation in the hopper independently of the flow of said mixture.

4. In an apparatus for recovering starch from a watery mixture of the same containing impurities of less specific gravity, a flat table, means for delivering said mixture to the table so as to produce a flow thereof across the table sufficiently slow to permit the starch to settle upon the table, a hopper depending from the table, there being an outlet from the bottom of the hopper and there being a second outlet at a point near the level of the table, and a device for gently moving the settled starch across the table and toward the hopper independently of the flow of said mixture and without agitating said mixture.

5. An apparatus for recovering starch from an impure watery mixture of the same and gluten which consists of a table, means for delivering a stream of said mixture upon the table at one end thereof, a hopper depending from the table at the opposite end thereof, there being an outlet at said latter end of the table at a point above the bottom of the hopper and there being also a second outlet extending from the bottom of the hopper, and means in addition to the stream itself for moving the settled starch across the table and toward said hopper.

6. An apparatus for recovering starch from an impure watery mixture of the same and gluten which consists of an elongated table having a depending hopper at one end, means for causing a stream of said mixture to flow gently across said table toward said hopper so as to permit the starch to settle, there being an outlet arranged at a point above said table adjacent to the hopper, a discharge pipe leading from the bottom of the hopper to a point above the bottom of the hopper, and means in addition to the stream itself for moving the settled starch across the table and into the hopper.

7. An apparatus for recovering starch from an impure watery mixture of the same and impurities of less specific gravity which consists of an elongated table having a depending hopper at one end, means for causing a stream of said mixture to flow gently across said table toward said hopper so as to permit the starch to settle, there being an outlet arranged at a point above said table adjacent to the hopper, a discharge pipe leading upwardly from the bottom of the hopper to a point above the bottom of the hopper, means for varying the height of the discharge end of said pipe relatively to the first mentioned outlet, and means for moving the settled starch across the table and into the hopper.

8. An apparatus for recovering starch from an impure watery mixture of the same and impurities of less specific gravity which consists of a table, means for delivering a stream of said mixture upon the table at one end thereof, a hopper depending from the table at the opposite end thereof, there being an outlet at said latter end of the table at a point above the top of the table and a second outlet extending from the bottom of the hopper, means for maintaining a circulation of the starch in the said hopper independently of the flow of said stream, and means in addition to the stream itself for moving the settled starch across the table and into the hopper.

9. An apparatus for recovering starch from an impure watery mixture of the same and impurities of less specific gravity which consists of a table, means for delivering a stream of said mixture upon the table at one end thereof, a hopper depending from the table at the opposite end thereof, there being an outlet at said latter end of the table at a point above the top of the table and a second outlet extending from the bottom of the hopper, and means in addition to the stream itself for moving the settled starch across the table and toward said hopper, and means for maintaining a circulation of the starch in the said hopper independently of the flow of said stream.

10. An apparatus for recovering starch from a watery mixture containing the same and impurities of less specific gravity comprising an elongated table having a depending hopper at one end, a scraping device including a series of long narrow blades arranged to rest upon the table, means for actuating said scraping device, a discharge pipe leading upwardly from the bottom of the hopper, means for varying the height of the outlet end of said pipe, and the apparatus being provided with an overflow at or above the plane of the table.

11. An apparatus for recovering starch from a watery mixture containing the same and impurities of less specific gravity comprising an elongated table having a depending hopper at one end, a scraping device including a series of long narrow blades arranged to rest upon the table, means for actuating said scraping device, a discharge pipe leading upwardly from the bottom of the hopper, means for varying the height of the outlet end of said pipe, and the apparatus being provided with a main overflow adjacent to the top of the hopper and a restricted auxiliary overflow a short distance beneath the main overflow.

12. In an apparatus for recovering starch from a watery mixture of the same containing impurities of less specific gravity, a flat table, a depending hopper at one end of the table, a discharge pipe leading upwardly from the lower end of the hopper, means for supplying the impure mixture at the end of the table opposite that to which the hopper is connected so as to permit the mixture to flow in a shallow stream toward the hopper, a long scraper extending across the table and having a height less than the depth of said stream, and means for moving said scraper slowly across the table and toward the hopper so as to carry the starch which settles upon the table to the hopper without agitating the stream, and the apparatus being provided with an overflow at a point adjacent to the plane of the table.

13. In an apparatus for recovering starch from a watery mixture of the same containing impurities of less specific gravity, a flat table, a depending hopper at one end of the table for containing a deep mass of pure watery starch, a reservoir for containing pure watery starch, a connection between said reservoir and the bottom of the hopper, an auxiliary reservoir located above the hopper and adapted to contain pure watery starch, and a discharge conduit leading from said latter reservoir into the hopper.

14. In an apparatus for recovering starch from a watery mixture of the same containing impurities of less specific gravity, a flat table, a depending hopper at one end of the table, an endless conveyer arranged above the table, elongated scrapers carried by said conveyer, the conveyer and scrapers being so arranged that when the conveyer is set in operation the scrapers travel over the surface of the table toward the hopper, means for actuating said conveyer, a discharge pipe leading from the bottom of said hopper, one side of the hopper being constructed to form an overflow, means for adjusting said side of the hopper so as to vary the level of the overflow, and means for supplying impure watery starch to the table at the end opposite the hopper.

15. In an apparatus for recovering starch from a watery mixture of the same containing impurities of less specific gravity, an elongated table, means for producing a shallow gently moving stream of said mixture across said table so as to permit starch to settle, a scraper of such depth as to lie beneath the surface of said stream, means for actuating said scraper so as to cause the settled starch to move in the direction of flow of the stream, and means for separating said stream into two sub-streams branching respectively from the top and bottom thereof.

16. In an apparatus for recovering starch from a watery mixture of the same containing impurities of less specific gravity, a flat table, means for causing a shallow gently moving stream of said mixture to flow across said table so as to permit the starch to settle upon the table, a scraper of a depth less than the depth of said stream, means for actuating said scraper so as to cause the starch to move across the table in the direction of flow of the stream, means for withdrawing the settled starch from the table in the downward direction, and means for withdrawing the exhausted water and impurities at the level of the upper portion of said stream.

In testimony whereof, we sign this specification in the presence of two witnesses.

LOUIS P. BAUER.
THEODOR SPECK.

Witnesses:
RUBY V. NASH,
WM. F. FREUDENREICH.